No. 895,301.

PATENTED AUG. 4, 1908.

A. G. RITCHIE.
TIRE.
APPLICATION FILED AUG. 7, 1907.

Witnesses
Hugh H. Ott
J. W. Garner

Inventor
Alfred G. Ritchie,
By Victor J. Evans
Attorney

UNITED STATES PATENT OFFICE

ALFRED G. RITCHIE, OF SAN JACINTO, CALIFORNIA.

TIRE.

No. 895,301.　　　Specification of Letters Patent.　　　Patented Aug. 4, 1908.

Application filed August 7, 1907. Serial No. 387,467.

*To all whom it may concern:*

Be it known that I, ALFRED G. RITCHIE, a citizen of the United States, residing at San Jacinto, in the county of Riverside and State of California, have invented new and useful Improvements in Tires, of which the following is a specification.

This invention relates to improvements in tires for automobile and other vehicle wheels, as hereinafter described and claimed.

One object of the invention is to effect improvements in the construction of the wheel rim.

A further object is to effect improvements in the construction of the cushioning tire.

Figure 1:
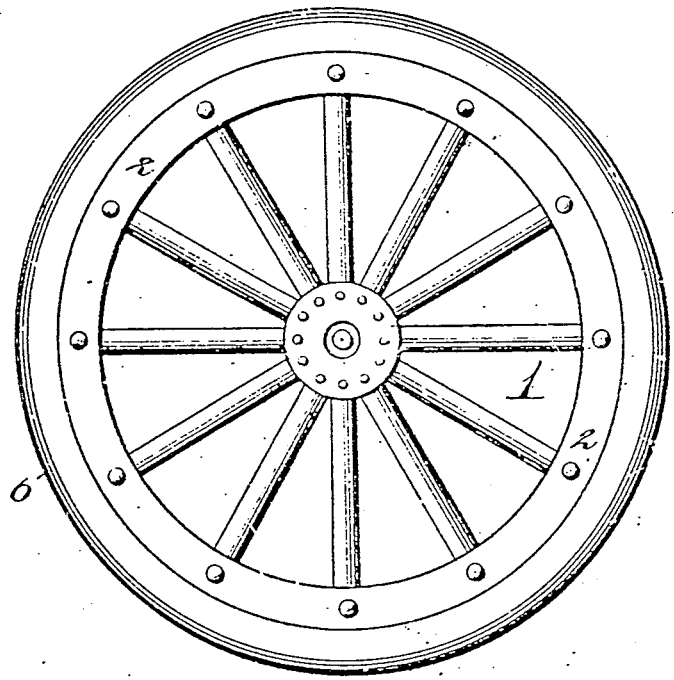
Figure 2:
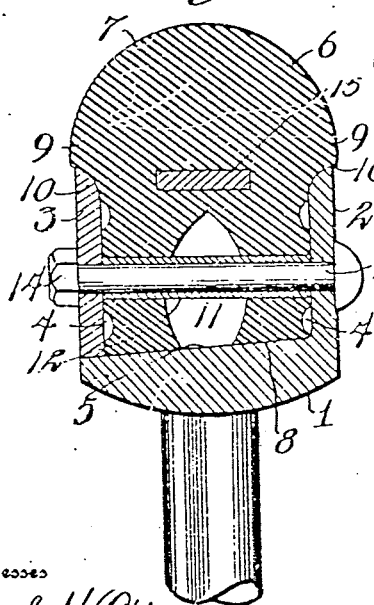
Figure 3:
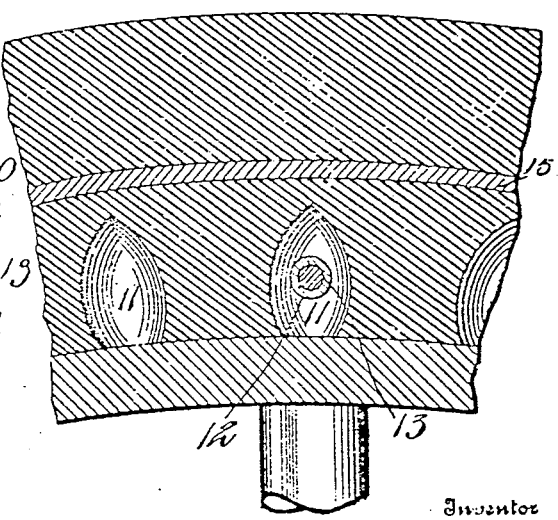

In the accompanying drawing, Figure 1 is an elevation of a wheel provided with my improved rim and tire. Fig. 2 is a detail transverse sectional view through the tire and rim. Fig. 3 is a detail longitudinal sectional view of the same.

In accordance with this invention the wheel rim 1 is formed with a fixed or integral flange 2 at one side and with a detachable flange 3 at the opposite side, the said flanges being provided with inwardly extending bosses 4 of which any suitable number may be employed and which may be at any suitable distance apart. The bearing or outer face 5 of the rim which forms the bottom of the peripheral annular circumferential groove of the rim between the flanges 2, 3 thereof, is inclined laterally in one direction as shown in Fig. 2.

The tire 6 which is a cushioning tire made of rubber, composition, or other suitable elastic or resilient material, is provided with a transversely rounded head or tread portion 7 and with a narrowed inner portion 8 which is adapted to fit in the groove of the rim formed between the flanges or walls 2, 3, and to bear against the tread face 5 of the rim which forms the bottom of said groove. The head 7 being broader than the inner portion 8 of the tire forms lateral or side shoulders or overhangs 9 which bear upon the outer edges of the walls or flanges 2, 3, such outer edges of such walls or flanges being outwardly rounded on their inner sides, as shown, and the said overhangs or shoulders 9 being concaved or hollowed in their under or inner sides, as at 10, to adapt them to receive and fit on such rounded edges of such walls or flanges. The bosses of such walls or flanges become pressed into the sides of the narrowed inner portion of the tire so that when the detachable flange or wall 3 is in place and the said narrowed inner portion of the tire is clamped between such detachable wall or flange and the fixed integral wall or flange 2 of the wheel rim, such bosses become embedded in the side surfaces of the said tire and the latter is prevented from "crawling".

In the inner side of the tire are openings or recesses 11 which are substantially ovoidal in form and which serve to lighten the tire, effect an economy of the material of which the tire is formed and also serve to form localized cushions in the tire which add to the resiliency and the elasticity thereof. The said openings, recesses or chambers are appropriately spaced apart. The narrowed inner portion of the tire is also provided with transverse openings in which tubular sleeves 12 are placed which are of suitable length and diameter and which bear between the flanges or side walls 2, 3, of the rim. Bolts 13 extend through alining openings in such walls or flanges 2, 3 and also through such tubular sleeves, their heads preferably bearing against the detachable wall or flange 3. It will be understood that the said bolts and sleeves coact with the side walls or flanges of the rim to securely and yet detachably fasten the tire on the rim. By first removing the nuts from the bolts and then removing the detachable wall or flange 3, the tire may be readily drawn from the said bolts and detached from the wheel rim. A reinforcing spring ring 15 is embedded in the tire at a point beyond the outer ends of the air cushions, as shown in Figs. 2 and 3.

It will be observed upon reference to Fig. 3 of the drawings that the reinforcing ring which is embedded in the tire is spaced from and lies without the air cushions formed by the recesses 11. This arrangement of the reinforcing ring with reference to the air cushions causes the ring to prevent cracks which may originate near the cushions from extending to the outer surface of the tire.

Having thus described the invention, what I claim as new and desire to secure by Letters Patent is:—

1. A vehicle wheel having a rim provided with peripheral flanges one of which is removable, in combination with a cushioning tire having recesses in its inner side forming localized air cushions therein and bolts connecting such flanges together, extending through such tire and also extending through certain of such localized air cushions.

2. A tire of the class described having recesses in its inner side forming localized air cushions therein, and a reinforcing ring embedded in such tire and spaced from and lying without such air cushions.

In testimony whereof, I affix my signature in presence of two witnesses.

ALFRED G. RITCHIE.

Witnesses:
  HUGH R. GOFF,
  D. G. D. KELLER.